United States Patent [19]

Lapp et al.

[11] 3,746,953

[45] July 17, 1973

[54] ELECTRICAL CAPACITOR

[75] Inventors: John Lapp, Franklin; Norbert R. Weiler, Greendale, both of Wis.

[73] Assignee: McGraw-Edison Company, Elgin, Ill.

[22] Filed: May 19, 1972

[21] Appl. No.: 255,156

[52] U.S. Cl.............................. 317/259, 317/260
[51] Int. Cl.............................................. H01g 3/04
[58] Field of Search................... 317/258, 260, 259; 174/25 R

[56] References Cited
UNITED STATES PATENTS

| | | | |
|---|---|---|---|
| 1,770,851 | 7/1930 | Hayman | 174/25 R |
| 3,430,116 | 2/1969 | Johnstone | 317/260 X |
| 3,450,968 | 6/1969 | Cox | 317/258 |
| 3,424,957 | 1/1969 | Katchman | 317/259 |
| 3,588,644 | 6/1971 | Nash | 317/259 |

FOREIGN PATENTS OR APPLICATIONS

| | | | |
|---|---|---|---|
| 106,535 | 2/1939 | Australia | 317/260 |

Primary Examiner—E. A. Goldberg
Attorney—R. J. Falkowski

[57] ABSTRACT

A power factor correction capacitor is constructed of several capacitor packs, each having convolutely wound layers of aluminum foil and polypropylene film with two layers of polypropylene film between the layers of foil. The several capacitor packs are assembled into a case and impregnated with trichlorodiphenyl with a bis (3, 4-epoxy-6-methylcyclohexylmethyl) adipate as an additive. During the winding process the foil is deformed by a deforming roller rolled against the roll of foil as it is wound into the capacitor pack.

58 Claims, 11 Drawing Figures

Patented July 17, 1973 3,746,953

ELECTRICAL CAPACITOR

This invention relates to capacitors, particularly to power capacitors with capacitor packs having alternate layers of foil and film and a dielectric impregnant, and a method and machine for manufacturing power capacitors.

In the construction of capacitors, particularly power factor correction capacitors, it is necessary to achieve a relatively low loss capacitor with a high energy density, long life, and reliability at a reasonable cost. It is standard practice to use aluminum foil as the electrode and to use two layers of polypropylene film separated by paper as the dielectric material between the layers of foil with a chlorinated diphenyl and a suitable stabilizing additive as an impregnant. In the development of capacitors the paper-polypropylene, or paper-film, capacitor was an improvement over the older all-paper capacitors which used only paper between the foils. The paper-film capacitor, as compared to the all-paper capacitor, has about one-third the losses, 30 greater energy density, and increased reliability. Also, the paper has a lower average voltage stress resulting in a lower energy density. However, the paper produces a significant amount of dielectric loss. Therefore, it has been apparent that elimination of the paper could produce a superior capacitor. However, after much experimentation and development work, the creation of a fully satisfactory all-film capacitor has not been previously achieved.

With this invention a low cost all-film capacitor that is highly reliable and efficient and, in fact, has all the desirable characteristics of and is in many ways superior to the paper-film capacitor is provided. This is accomplished primarily by modification of the manufacturing techniques and by selectively deforming the foil in a manner that enables substantially complete impregnation of the film by the chlorinated diphenyl.

Objects and advantages of the invention will be apparent from the following detailed description.

Figure 1:
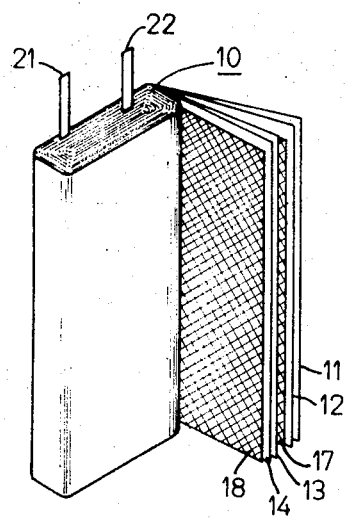
FIG. 1 is a perspective view of a capacitor pack constructed according to this invention.

Referring to FIG. 1, a capacitor pack 10 comprises film strips 11 and 12 of any suitable dielectric polymeric film forming a first film layer, film strips 13 and 14 forming a second film layer, and foil strips 17 and 18 of any suitable conductive material between the film layers convolutely wound and compressed to form a flattened pack as shown. Film strips 13 and 14 are wound between foil 18 and foil 17 of the next layer of film and foil, and strips 11 and 12 are wound between foil strips 17 and 18, all continuously wound to produce a capacitor pack having two plates or electrodes formed by foil strips 17 and 18, respectively. Electrical connecting tabs 21 and 22 are inserted to make an electrical connection to foil strip 17 and foil strip 18, respectively, in a manner known in the art.

Figure 2:
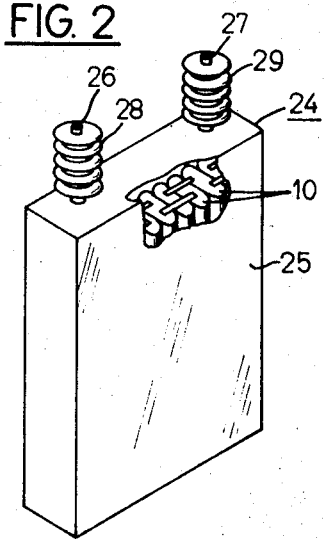
FIG. 2 is a perspective view of a power capacitor having several capacitor packs, as shown in FIG. 1, connected in series.

Referring to FIG. 2, a power capacitor 24 comprises a casing 25, several capacitor packs 10 connected in series or as desired to provide a desired characteristic for the capacitor, and electrical terminals 26 and 27 mounted within insulating bushings 28 and 29, respectively, which are mounted in openings in casing 25. The capacitor uses any suitable metallic foil, such as aluminum foil, as the conductive foil and is impregnated with a suitable dielectric organic liquid, typically a halogenated aromatic compound such as, for example, trichlorodiphenyl. For best results a suitable stabilizing additive is added to the dielectric liquid and may be, for example, any suitable epoxide, such as bis (3, 4-epoxy-6-methylcyclohexylmethyl) adipate. The dielectric film is a suitable dielectric polymeric compound, such as, for example, polypropylene.

Figure 3:
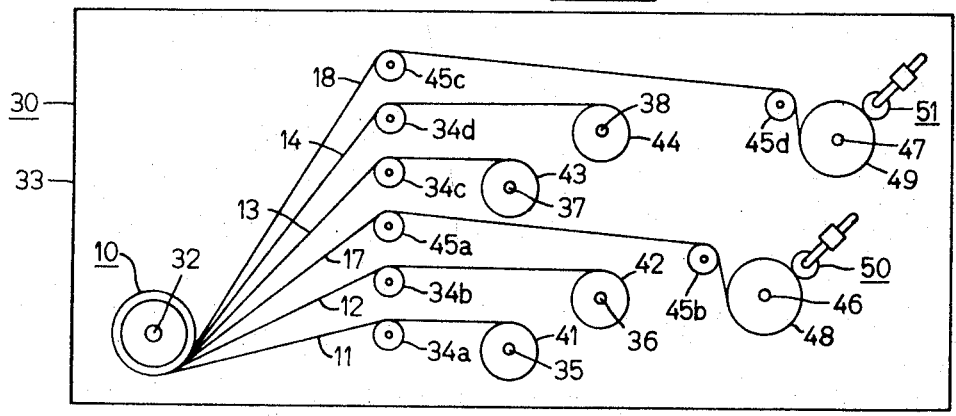
FIG. 3 is a simplified schematic drawing of a capacitor winding machine used to wind the capacitor pack shown in FIG. 1.

Referring to FIG. 3, a capacitor winding machine 30, generally of any known type that may be used to wind a capacitor pack, such as capacitor pack 10, is shown in a simplified form and comprises a winding means for winding film strips 11, 12, 13 and 14 and foil strips 17 and 18 into a capacitor pack; a film holding means for holding and unwinding rolls of film; a foil holding means for holding and unwinding rolls of foil; a control means for controlling the winding means, the film holding means, and the foil holding means to effect the unrolling of rolls of film and foil and the winding onto the winding means to form the capacitor pack; and a deforming means for deforming the foil by applying a selected pressure at selectively positioned points to the roll of foil as it is being unwound to produce selected deformation through several layers of foil on the roll.

The winding means comprises a winding spindle or roller 32 mounted on a panel 33 and rotatable by any known means (not shown) in a clockwise direction (as seen in FIG. 3) to roll the foil strips and film strips into capacitor pack 10.

The film holding means comprises idler rollers 34a, 34b, 34c and 34d, film spindles or rollers 35, 36, 37 and 38, each adapted in any known manner to hold and unwind film rolls 41, 42, 43 and 44, respectively, by being controllably rotated in a counterclockwise direction by any known means (not shown).

The foil holding means comprises idler rollers 45a, 45b, 45c and 45d, spindles or rollers 46 and 47 adapted to hold and unwind foil rolls 48 and 49, respectively, by being controllably rotatable in a counterclockwise direction by any known means (not shown).

A control means of any known type (not shown) controls the speed of rotation of winding roller 32 and to the degree necessary the rotation of film rollers 35, 36, 37 and 38 and foil rollers 46 and 47 to assure a tight uniform capacitor pack in any manner known in the art. This may be done by controlling and correlating the rotation of the rollers or by placing appropriate controlled tension on the rollers to insure a tight roll and to insure that breaking does not occur as the film and foil are wound into a capacitor pack.

Figure 4:
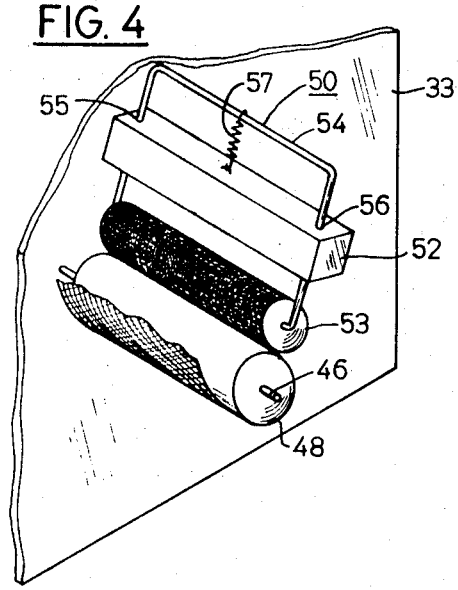
FIG. 4 is a simplified perspective view of a portion of the winding machine shown in FIG. 3 showing the deforming roller and foil roll in more detail.

The deforming means comprises a deforming roller assembly 50 and a similar deforming roller assembly 51 each adjacent foil rolls 48 and 49, respectively, to deform the foil on each foil roll. Referring to FIG. 4, deforming roller assembly 50 is shown in a simplified and schematic form, is mounted on panel 33, and comprises a support block 52 mounted on panel 33 in any known manner adjacent to foil roll 48 and foil roller 46, a deforming roller 53, a roller support frame 54 passing through guide holes 55 and 56 in support block 52 and supporting deforming roller 53, and a biasing means including a spring 57 connected between support frame 54 and support block 52 to apply compressive force between deforming roller 53 and foil roll 48. The biasing means may be of any known type that can apply a controlled and even force to force roller 53 against foil roll 48. The roller assemblies thus include a means for forcing the deforming rollers to press against foil rolls 48 and 49 with a selected force furnished by some appropriate means such as spring 57 so that some degree of deformation takes place through several layers of foil.

Figure 11:
FIG. 11 is a partial detailed view of the deforming roller shown in FIG. 10.
Figure 10:
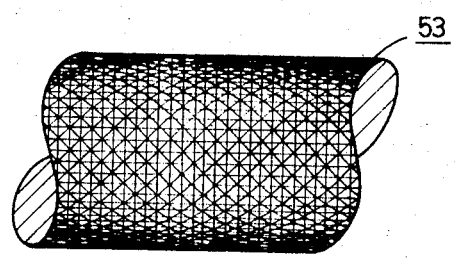
FIG. 10 is a more detailed showing of the roller shown in FIG. 4.

Referring to FIGS. 10 and 11, deforming roller 53 is shown in a schematic detail and has spirally cut pyramidal shaped points 61 resulting from oppositely spiraling grooves 62 and 63 and preferably has the points positioned about fourteen to the inch across the roller. This configuration has been shown to provide satisfactory deformation of the foil with a reasonable pressure, in the range of 1,500 grams/linear inch of contact, which will result in satisfactory impregnation of the capacitor rolls when assembled.

Figure 5:
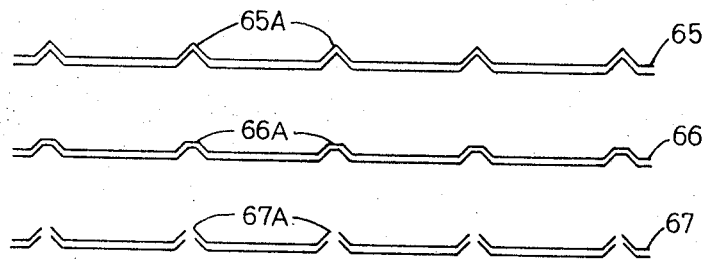
FIG. 5 is an end view of the foil illustrating three exemplary types of deformations of the foil that occur.
Figure 6:
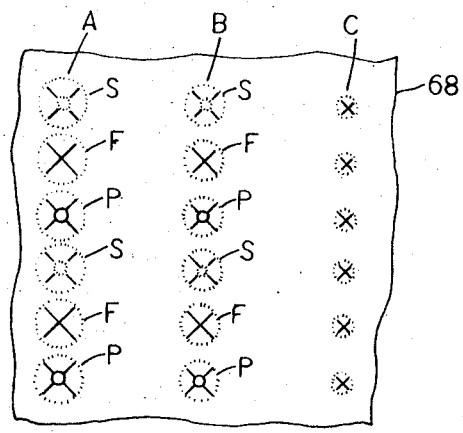
FIG. 6 is a top view of a foil section of foil having exemplary deformations as in FIG. 5.

Referring to FIG. 5, exemplary foil strip sections 65, 66 and 67 have deformations resulting from deforming roller 53. The deformations can be categorized to be said to take any one of the three forms 65A, 66A or 67A on foil sections 65, 66 and 67, respectively. Deformations 65A conform to the configuration of points 61 of deforming roller 53, deformations 66A have blunted edges and take a truncated pyramidal form, and deformations 67A are perforations caused as points 61 force through the foil. The perforation holes are small, with a maximum size of about pinhole size, and just barely visible to the naked eye when viewed against a bright light behind the foil. Having about 20 per cent of the indentations perforated seems to be a good portion to insure proper impregnation although the range can apparently be quite great, perhaps up to about 50 percent or more. The foil has a combination in a random manner of the three different types of deformations and of the variations of each type to produce an exemplary foil strip section 68 as shown in FIG. 6. The deformations are a combination of the three deformations shown in FIG. 5 in combination with lesser deformations and indentations caused by the effect of the points through several layers of foil as pressed upon by the deforming roller. The maximum depth of deformation allowable appears to be about 8 mils, but a maximum depth of about 6 mils seems to be best. Contrary to usual expectations the deformations do not take up extra space in the capacitor if generally within these tolerances.

FIG. 6 shows an idealized, theoretical deformation that would occur in these rows, A, B and C, through three layers. Actually, there is overlapping of these deformations and there is some effect through about 30 to 50 layers when applied to foil of about 0.22 mils in thickness, a size of foil that has been shown to be highly satisfactory. A spacing between the rows of about one-fourteenth of an inch has been found to be satisfactory to accomplish this with a deforming roller having pyramidal points extending upwardly by about 0.039 inches above the base of the grooves, as shown in FIG. 11. The first row A shows typical indentations placed on the outer layer with some full depressions F, some smaller depressions S, and some depressions P producing perforations. The second row B shows something that can occur at the second layer with a few full depressions F, a few partial depressions S, and a few perforations P, and the third row C shows the effect at the third layer where perforations are not likely to occur and the depressions are not as deep or as sharply formed. The random combination and variations of these through the several layers combine to superimpose the deformations on top of each other in a random manner along the rolls as the foil is unwound. If considered necessary, two deforming rollers could be used for each roll of foil to insure a random pattern.

Figure 7:
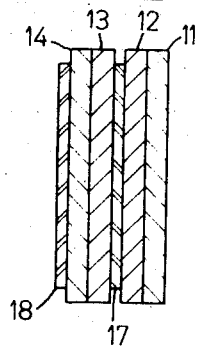
FIGS. 7, 8 and 9 are partial sectional end views of a capacitor pack showing different configurations of lapping of the foil and film.
Figure 8:
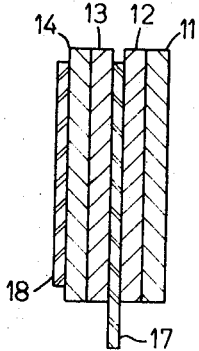
Figure 9:
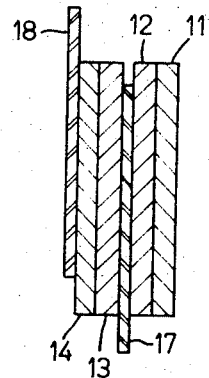

Referring to FIGS. 7, 8 and 9, since it is apparently easier to wet with the liquid dielectric along the foil-film layers than it is between film layers, it may be desirable to have at least one foil strip, such as foil strip 17, as shown in FIG. 8, or both foil strips 17 and 18, as shown in FIG. 9, extend outwardly from the capacitor pack. However, all the configurations shown in FIGS. 7, 8 and 9 appear to be satisfactory.

An all-film capacitor constructed according to this invention has been found to provide excellent characteristics. One of the characteristics studied is the corona starting voltage of several samples using two sheets of one-half mil polypropylene film with the film extended beyond the deformed foil as shown in FIG. 7. It was found that the corona starting voltages were very consistent over many series of tests and after many hours of operation had remained in the range of 2,600 to 3,250 volts. This has been found true even though the usual expectation of those skilled in the art was that deformations would be harmful because of increased electrical stresses at the deformation. The tests conducted on units according to this invention indicate that this is not true, and the units were found to be superior to film-paper capacitors.

Another advantage of this invention occurs in the method of construction of capacitors in that complete impregnation of the dielectric into the capacitor has been obtained without a previously required heating process. Previously, capacitor manufacturing required heating the capacitor pack to a temperature of 180° F or higher and applying a high vacuum to draw off any volatile material, such as water vapor, from the capacitor pack. After the capacitor pack had been sufficiently dried, it was cooled and an impregnant was added to impregnate the dielectric material. The capacitor pack was then typically permitted to remain under vacuum with the temperature above 120° F but lower than about 170° F. The capacitor was then sealed and ready for the manufacturing processes.

A capacitor constructed according to this invention eliminates a large amount of the moisture present in the capacitor because of the absence of paper since the film and foil do not substantially retain much water vapor and gas. Therefore, the small amount of moisture removal necessary can be accomplished at room temperature of at only a slightly elevated temperature of about 80° or 90° F. This results in a shorter drying time, and no cooling of the unit is required before liquid is admitted for impregnation purposes, thereby substantially reducing the total processing time required.

Therefore, according to this invention a method of constructing capacitors comprises winding a capacitor pack with convolutely wound alternate layers of film and foil with two layers of film between each layer of foil, deforming the foil by using a deforming roller of the type shown pressing with a selected pressure against the roll of foil as it is being wound onto the capacitor roll. The pressure is selected to produce indentations of the type desired within a selected range of depths and selected percentage of perforations. After the capacitor roll is wound, it is then shaped into the desired shape and placed into a standard capacitor casing. The capacitor is then put under vacuum at room temperature or a slightly raised temperature, and then is subsequently impregnated with a dielectric liquid such as chlorinated diphenyl. The capacitor is then sealed and prepared for further manufacturing processes.

We claim:

1. A capacitor comprising:
   a casing;
   a capacitor pack in the casing having two conductive strips and two dielectric layers wound alternately to form the capacitor pack with at least one of said conductive strips having randomly sized deformations formed by indentations on one side of the foil and corresponding elevations on the other side; and
   a dielectric impregnating said capacitor pack.

2. A capacitor according to claim 1 wherein said dielectric layers each comprise a strip of insulating film.

3. A capacitor according to claim 2 wherein said insulating film strip is a polypropylene film strip.

4. A capacitor according to claim 1 wherein said dielectric layers each comprise two adjacent strips of polypropylene film.

5. A capacitor according to claim 4 wherein said conductive strips are strips of metallic foil.

6. A capacitor according to claim 4 wherein said conductive strips are strips of aluminum foil.

7. A capacitor according to claim 1 wherein both of said conductive strips have said randomly sized deformations.

8. A capacitor according to claim 7 wherein said deformations comprise a substantially random combination of smaller indentations, larger indentations, and indentations of sufficient depth to just produce perforations.

9. A capacitor according to claim 7 wherein said indentations vary in depth up to a maximum of about the magnitude of 6 mils.

10. A capacitor according to claim 7 wherein said indentations are randomly placed along linear rows a distance apart of about the magnitude of one-fourteenth of an inch.

11. A capacitor according to claim 7 wherein at least some indentations are of sufficient depth to just barely produce perforations.

12. A capacitor according to claim 7 wherein said dielectric layers each comprise a strip of insulating dielectric polymeric film.

13. A capacitor according to claim 12 wherein said insulating film strip is a polypropylene film strip.

14. A capacitor according to claim 12 wherein said dielectric layers each comprise two adjacent strips of a dielectric polymeric film.

15. A capacitor according to claim 14 wherein said dielectric film is polypropylene.

16. A capacitor according to claim 13 wherein said deformations comprise a substantially random combination of smaller indentations, larger indentations, and indentations of sufficient length to just produce perforations.

17. A capacitor according to claim 16 wherein said indentations vary in depth up to a maximum of about the magnitude of 6 mils.

18. A capacitor according to claim 17 wherein said indentations are randomly placed along linear rows a distance apart of about the magnitude of one-fourteenth of an inch.

19. A capacitor according to claim 18 wherein said dielectric layers each comprise two adjacent strips of polypropylene film.

20. A capacitor according to claim 13 wherein said conductive strips are strips of metallic foil.

21. A capacitor according to claim 20 wherein said conductive strips are strips of aluminum foil.

22. A capacitor according to claim 21 wherein said dielectric layers each comprise two adjacent strips of polypropylene film.

23. A capacitor according to claim 13 wherein at least some indentations are of sufficient depth to produce perforations of random size up to a maximum of about pinhole size.

24. A capacitor according to claim 23 wherein said conductive strips are strips of metallic foil.

25. A capacitor according to claim 23 wherein said conductive strips are strips of aluminum foil.

26. A capacitor according to claim 7 wherein said dielectric liquid comprises a stabilizing additive.

27. A capacitor according to claim 7 wherein said dielectric liquid is a halogenated aromatic compound and said additive is an epoxide.

28. A capacitor according to claim 6 wherein said dielectric liquid is trichlorodiphenyl and said additive is bis (3, 4-epoxy-6-methylcyclohexylmethyl) adipate.

29. A capacitor comprising:
   a casing;
   a capacitor pack within the casing having two conductive strips of foil and two dielectric layers alternately wound to form the capacitor pack with at least one of the conductive strips of foil having randomly sized deformations formed by applying a deforming roller against a roll of the conductive foil with a selected force and rolling said deforming roller against said roll of foil as said foil is rolled off said roll, said deforming roller having selectively positioned raised points adapted to push deformations into said foil through several layers of foil on said roll upon the application of said selected force; and
   a dielectric liquid impregnating the capacitor pack.

30. A capacitor according to claim 26 wherein said dielectric layers are comprised of at least one strip of a dielectric polymeric film.

31. A capacitor according to claim 29 wherein said dielectric layers each comprise two adjacent strips of polypropylene film.

32. A capacitor according to claim 29 wherein both of said conductive strips have said randomly sized deformations.

33. A capacitor according to claim 32 wherein said dielectric liquid comprises a halogenated aromatic compound and a stabilizing additive.

34. A capacitor according to claim 32 wherein said dielectric liquid comprises a chlorinated diphenyl and an epoxide additive.

35. A capacitor according to claim 34 wherein said chlorinated diphenyl is trichlorodiphenyl and said additive is bis (3, 4-epoxy-6-methylcyclohexylmethyl) adipate.

36. A capacitor according to claim 32 wherein said deforming roller has the raised points equally spaced apart from each other to produce rows of indentations in the foil in the direction of rotation of the roll with said rows spaced apart from each other by about one-fourteenth of an inch.

37. A capacitor according to claim 36 wherein said deforming roller comprises equally spaced spiral grooves having a selected negative pitch and equally spaced spiral grooves having a positive pitch and intersecting the other set of grooves at an angle with said grooves having a slope selected to leave pyramidal-shaped points between the intersections of the grooves.

38. A capacitor according to claim 37 wherein said selected force is selected to produce maximum indentations of about the magnitude of 6 mils.

39. A capacitor according to claim 38 wherein said selected force and raised points are selected to produce a random selection of maximum sized indentations, smaller sized indentations, and indentations resulting in perforations.

40. A capacitor according to claim 39 wherein said selected force is selected to produce indentations of sufficient depth to perforate the foil in about 20 per cent of the indentations.

41. A capacitor according to claim 40 wherein some of said perforations are of a maximum size about that of a pinhole size.

42. A capacitor according to claim 41 wherein said dielectric layers are comprised of a strip of polypropylene film.

43. A capacitor according to claim 41 wherein said dielectric layers each comprise two adjacent strips of polypropylene film.

44. A capacitor according to claim 37 wherein said selected force is selected to produce a maximum indentation of about the magnitude of 6 mils.

45. A capacitor according to claim 44 wherein said selected force is selected to produce indentations of sufficient depth to perforate the foil in about 20 per cent of the indentations.

46. A capacitor according to claim 32 wherein said deforming roller has the raised points equally spaced apart from each other to produce rows of indentations in the foil in the direction of rotation of the roll with said rows spaced apart from each other by about one-fourteenth of an inch.

47. A capacitor according to claim 46 wherein said perforations are of a maximum size about that of a pinhole size.

48. A capacitor according to claim 45 wherein said deforming roller has the raised points spaced apart from each other to produce rows of indentations in the foil with said rows spaced apart from each other by about one-fourteenth of an inch.

49. A capacitor according to claim 48 wherein said selected force is selected to produce indentations of sufficient depth to perforate the foil in about 20 per cent of the indentations.

50. A capacitor according to claim 49 wherein said dielectric layers are each comprised of a strip of polypropylene film.

51. A capacitor according to claim 35 wherein said selected force and raised points are selected to produce a random selection of maximum sized indentations, smaller sized indentations, and indentations resulting in perforations.

52. A capacitor according to claim 51 wherein said dielectric layers each comprise a sheet of a dielectric polymeric film.

53. A capacitor according to claim 51 wherein said dielectric layers each comprise two strips of polypropylene film.

54. A capacitor according to claim 51 wherein said selected force is selected to produce indentations of sufficient depth to perforate the foil in about 20 per cent of the indentations.

55. A capacitor according to claim 54 wherein some of said perforations are of a maximum size about that of a pinhole size.

56. A capacitor according to claim 32 wherein said selected force is selected to produce indentations of sufficient depth to perforate the foil in about 20 per cent of the indentations.

57. A capacitor according to claim 56 wherein some of said perforations are of a maximum size about that of a pinhole size.

58. A capacitor according to claim 57 wherein said dielectric layers each comprise a sheet of polypropylene film.

* * * * *